United States Patent
Robson et al.

(10) Patent No.: US 10,316,752 B2
(45) Date of Patent: Jun. 11, 2019

(54) GAS TURBINE COOL-DOWN PHASE OPERATION METHODS FOR CONTROLLING TURBINE CLEARANCE BY ADJUSTING AIR FLOW RATE

(71) Applicant: ANSALDO ENERGIA SWITZERLAND AG, Baden (CH)

(72) Inventors: Christopher Michael Robson, Ennetbaden (CH); Gaurav Pathak, Ennetbaden (CH); Guenter Filkorn, Nussbaumen (CH); Andreas Rueter, Nussbaumen (CH); Giovanni Cataldi, Zürich (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 47 days.

(21) Appl. No.: 15/198,932

(22) Filed: Jun. 30, 2016

(65) Prior Publication Data
US 2017/0002740 A1    Jan. 5, 2017

(30) Foreign Application Priority Data
Jul. 2, 2015 (EP) ................... 15175098

(51) Int. Cl.
*F02C 7/18*    (2006.01)
*F01D 11/24*    (2006.01)
(Continued)

(52) U.S. Cl.
CPC ............... *F02C 7/18* (2013.01); *F01D 11/24* (2013.01); *F01D 21/00* (2013.01); *F01D 25/12* (2013.01);
(Continued)

(58) Field of Classification Search
CPC .... F02C 7/18; F02C 7/185; F02C 6/08; F02C 9/18; F01D 11/24; F01D 21/00; F01D 21/12; F01D 21/04; F01D 25/12
See application file for complete search history.

(56) References Cited

U.S. PATENT DOCUMENTS 4,967,552 A * 11/1990 Kumata ............... F01D 5/08
                                                          415/115
6,401,460 B1    6/2002 Xia
(Continued)

FOREIGN PATENT DOCUMENTS

EP    2 213 843 A2    8/2010
EP    2 587 028 A2    5/2013

OTHER PUBLICATIONS

European Search Report dated Dec. 8, 2015, by the European Patent Office in corresponding European Patent Application No. 15 17 5098.

*Primary Examiner* — William H Rodriguez
(74) *Attorney, Agent, or Firm* — Buchanan Ingersoll & Rooney PC

(57) ABSTRACT

The application describes a method of operating a gas turbine during a cool-down phase. The gas turbine provides a compressor, a combustor downstream of the compressor, and a turbine downstream of the combustor, with the turbine providing a turbine vane carrier. The method includes feeding a flow of cooling air from the compressor to the turbine vane carrier, measuring a temperature of the flow of cooling air and measuring a temperature of the turbine vane carrier. In the method, the flow of cooling air is fed at a first flow rate when the temperature of the turbine vane carrier is lower than the temperature of the cooling air, and the flow of cooling air is fed at a second flow rate when the temperature (Continued)

of the turbine vane carrier is higher than the temperature of the cooling air, wherein the first flow rate is higher than the second flow rate.

10 Claims, 2 Drawing Sheets

(51) Int. Cl.
  *F01D 21/00* (2006.01)
  *F01D 25/12* (2006.01)
  *F02C 3/04* (2006.01)
  *F02C 9/00* (2006.01)
  *F01D 21/04* (2006.01)
  *F01D 21/12* (2006.01)
(52) U.S. Cl.
  CPC ............... *F02C 3/04* (2013.01); *F02C 9/00* (2013.01); *F01D 21/04* (2013.01); *F01D 21/12* (2013.01)

(56) References Cited

U.S. PATENT DOCUMENTS

| | | | |
|---|---|---|---|
| 6,626,635 B1 | 9/2003 | Prowse et al. | |
| 8,015,826 B2 * | 9/2011 | Myers | F01K 13/02 60/782 |
| 9,169,782 B2 * | 10/2015 | Subramaniyan | F01D 5/187 |
| 2003/0046939 A1 * | 3/2003 | Hyakutake | F01D 21/12 60/782 |
| 2004/0055273 A1 * | 3/2004 | Hirayama | F02C 9/28 60/39.281 |
| 2010/0154434 A1 * | 6/2010 | Kubota | F02C 7/18 60/785 |
| 2010/0189551 A1 | 7/2010 | Ballard, Jr. et al. | |
| 2013/0104564 A1 | 5/2013 | Arar | |
| 2013/0111919 A1 * | 5/2013 | Chehab | F01D 11/24 60/778 |
| 2016/0186597 A1 * | 6/2016 | Uesaka | F01D 21/00 415/48 |
| 2016/0326915 A1 * | 11/2016 | Baladi | F01D 11/24 |
| 2017/0101933 A1 * | 4/2017 | Mukhopadhyay | F02C 7/185 |
| 2018/0010520 A1 * | 1/2018 | Iwasaki | F02C 7/185 |

* cited by examiner

GAS TURBINE COOL-DOWN PHASE OPERATION METHODS FOR CONTROLLING TURBINE CLEARANCE BY ADJUSTING AIR FLOW RATE

TECHNICAL FIELD

The present disclosure relates to methods of operating a gas turbine, and particularly methods of operating a gas turbine during a cool-down phase.

BACKGROUND OF THE INVENTION

Systems with rotors and stators such as gas turbines generally require a gap to be left between the rotating part and the stationary part to provide clearance and avoid rubbing. However, providing a gap allows for leakage through the gap. As leakage through such gaps reduces efficiency in gas turbines, there is a general desire to minimise the size of these clearance gaps in gas turbines.

Various factors can play a part in establishing clearance requirements, including the large temperature variations seen in gas turbines. These temperature variations can result in significant amounts of thermal expansion, and this can be further complicated by the use of materials with different coefficients of thermal expansion and by differences in the rate of cooling of different parts.

One example of a place where clearance plays a major part is between the rotor in the turbine of a gas turbine and the stator surrounding the rotor; that is, between the rotor and blades on the one hand and the turbine vane carrier and blades on the other hand. It has been appreciated that improvements could be made that would enable reduction of the clearance in this region.

SUMMARY OF THE INVENTION

The invention is defined in the appended independent claims to which reference should now be made. Advantageous features of the invention are set forth in the dependent claims.

According to a first aspect, there is provided a method of operating a gas turbine during a cool-down phase, the gas turbine providing a compressor, a combustor downstream of the compressor, and a turbine downstream of the combustor, the turbine providing a turbine vane carrier, the method comprising the steps of feeding a flow of cooling air from the compressor to the turbine vane carrier, measuring a temperature of the flow of cooling air and measuring a temperature of the turbine vane carrier, wherein the flow of cooling air is fed at a first flow rate when the temperature of the turbine vane carrier is lower than the temperature of the cooling air, and wherein the flow of cooling air is fed at a second flow rate when the temperature of the turbine vane carrier is higher than the temperature of the cooling air, wherein the first flow rate is higher than the second flow rate.

This method can reduce or minimise the cooling of the turbine vane carrier by cooler air flows during the cool-down phase, and can therefore slow cooling of the turbine vane carrier during the cool-down phase (particularly during the first hours of rotor barring of the gas turbine), which can allow a decrease of running clearances for both blades and vanes in the turbine (for example a reduction of up to 0.5 mm for blade 1 clearance), and a gas turbine performance increase. More specifically, the reduced rate of cooling can allow for an increase in the pinch point clearance, meaning that the running clearance can be reduced to bring the pinch point clearance back to its previous level (i.e. maintaining the same rubbing risk, but with a reduced steady state running clearance). This method can increase gas turbine performance by reducing leakage. This method can also provide a simple and cheap method of controlling the turbine vane carrier temperature and can provide a significant performance increase at low cost. For example, it can provide a simpler and cheaper method of control than active clearance control measures using external media.

Preferably, the flow of cooling air is fed from the compressor to the turbine vane carrier through a cooling unit. Preferably, the flow of cooling air is fed from the compressor to the turbine vane carrier through a once-through cooler. This method can use the residual heat in a cooling unit such as a once-through cooler (OTC) to reduce the rate of turbine vane carrier cooling.

Preferably, a fan is used to direct the flow of cooling air through the cooling unit. This method can increase the flow of cooling air from the cooling unit to the turbine vane carrier, and can therefore increase the transfer of heat from the cooling unit to the turbine vane carrier.

Preferably, the flow of cooling air is a first flow of cooling air and a second flow of cooling air is also fed from the compressor to the turbine vane carrier, and wherein the first flow of cooling air is fed from a first point in the compressor and the second flow of cooling air is fed from a second point in the compressor, the first point being downstream from the second point in a fluid flow direction. Preferably, measuring includes measuring the temperature of the second flow of cooling air, and the second flow of cooling air is fed at a first rate when the temperature of the turbine vane carrier is lower than the temperature of the second flow of cooling air, wherein the second flow is fed at a second rate when the temperature of the turbine vane carrier is higher than the temperature of the second flow of cooling air, and wherein the first rate is higher than the second rate. Feeding a second flow in this manner can slow the cooling of the turbine vane carrier further.

Preferably, the second flow of cooling air is also fed through the cooling unit. This method can further enhance the advantages outlined above by further slowing the cooling of the turbine vane carrier.

Preferably, a clearance within the turbine is monitored, and wherein the flow rate of the flow of cooling air is only altered from the first rate to the second rate when the clearance is below a set minimum clearance. This method can allow for control of the flow rate only when necessary.

Preferably, the temperature of the flow of cooling air is measured by directly measuring the temperature of the flow of cooling air, or is measured indirectly by measuring a gas turbine parameter and estimating the temperature of the flow of cooling air. Preferably, the gas turbine parameter is a temperature of a different gas turbine component or a time since a start of a cool-down phase of the gas turbine. These methods allow relevant temperatures to be monitored or estimated.

In a second aspect, there is provided a combustor downstream of the compressor, a turbine downstream of the combustor, the turbine providing a turbine vane carrier, and a controller configured and arranged to carry out the methods described above.

BRIEF DESCRIPTION OF THE DRAWINGS

An embodiment of the invention will now be described by way of example only and with reference to the accompanying drawings in which.

DETAILED DESCRIPTION OF THE PREFERRED EMBODIMENTS

Figure 1:
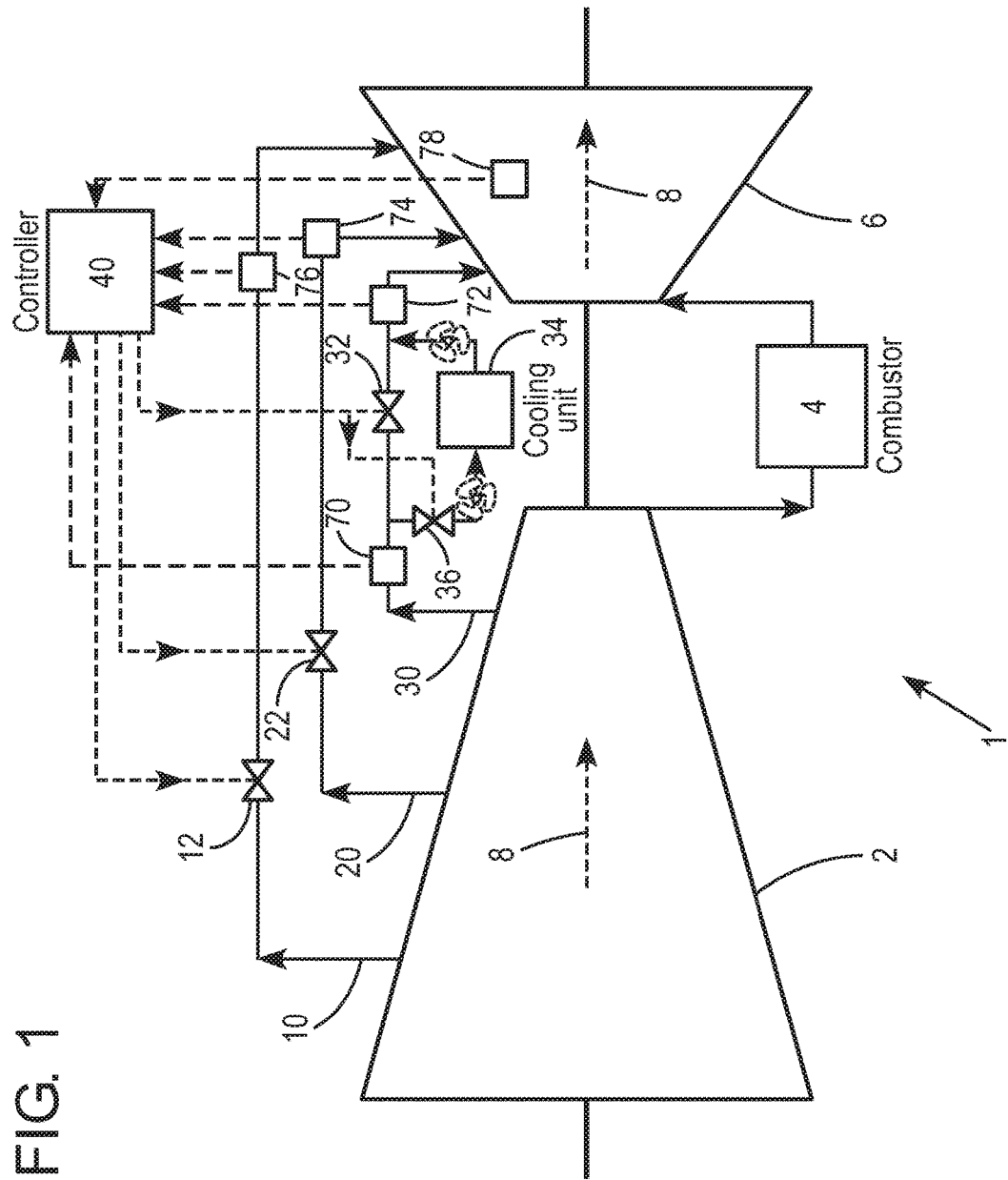
FIG. 1 shows a cross-section of a gas turbine with which the inventive method can be carried out.

A gas turbine 1 is described with reference to FIG. 1. The gas turbine 1 comprises a compressor 2, a combustor 4 downstream of the compressor 2 and a turbine 6 downstream of the combustor 4.

Air flows into the compressor 2 where it is compressed, sent to the combustor 4 and mixed with fuel in the combustor 4. The hot gases resulting from combustion of the air-fuel mixture in the combustor 4 are sent to the turbine 6 and expanded in the turbine 6. Dashed arrows 8 show the general flow direction of air through the compressor 2 and of hot gases through the turbine 6. This fluid flow direction 8 also corresponds to the direction of the axis of the gas turbine 1.

For cooling, a portion of the air in the compressor is bled off at three locations, resulting in pipes directing first, second and third cooling air flows, namely high-pressure cooling air 30, medium-pressure cooling air 20 and low-pressure cooling air 10 respectively. Each of the pipes has a control valve, namely a first or high-pressure control valve 32, a second or medium-pressure control valve 22, and a third or low-pressure control valve 12. These control valves 12, 22, 32 can be controlled manually or by using an optional controller 40.

Optionally, a cooling unit 34 such as a once-through cooler may be used to cool part or all of the high-pressure cooling air 30. An associated cooling unit control valve 36 could additionally be provided to control flow through the cooling unit; control valve 36 could be operated manually or with the controller 40.

Figure 2:
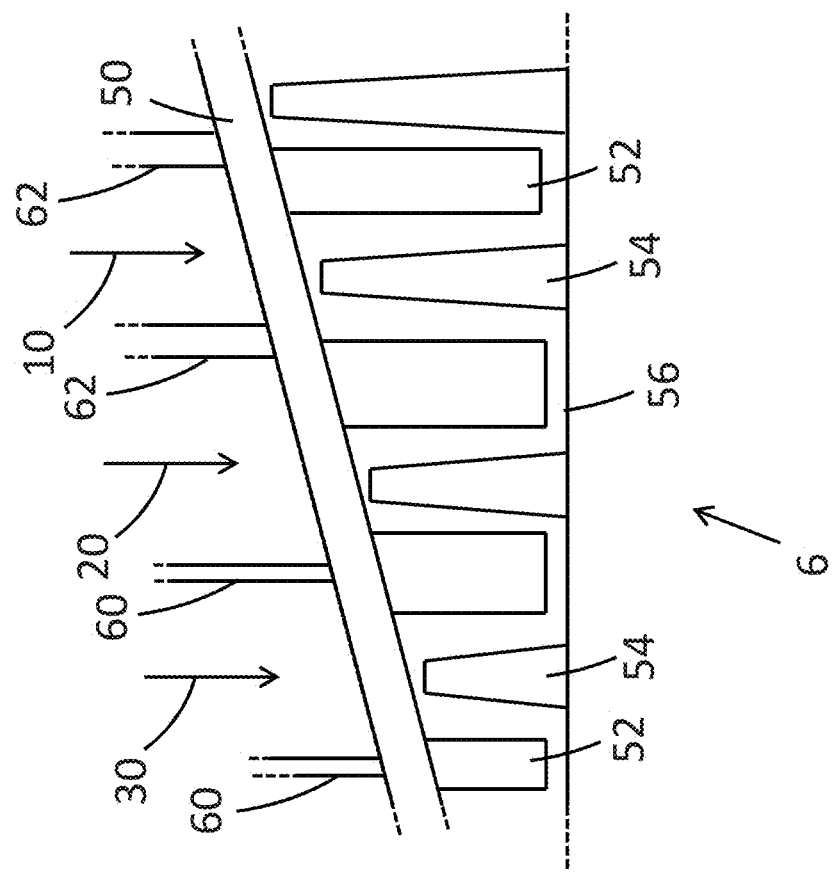
FIG. 2 shows a cross-section with further details of the turbine of FIG. 1.

The three cooling air flows 10, 20, 30 are fed to the turbine 6, which is shown in more detail in FIG. 2. The turbine comprises a turbine vane carrier 50, to which vanes 52 are attached. Blades 54 are arranged in between the vanes, with the blades being attached to a rotor 56.

The different cooling air flows are at different pressures, and are kept separated by membranes 60 and supports 62. The cooling air 10, 20, 30 then enters the turbine vane carrier. The high-pressure cooling air 30 is fed to the high-pressure end of the turbine, the medium-pressure cooling air 20 to the middle of the turbine and the low-pressure cooling air 10 to the low-pressure end of the turbine.

When in use, gas turbines typically go through cycles in which they are off, then switched on, and then switched off again. They may be run at different loads, such as full load (100% load), 80% load, or other load levels, and may be switched between different load levels during use. Depending on power demands, some gas turbines may be frequently switched on and off or switched between load levels, whereas others run at full load for extended periods of time. The invention described herein is not restricted to a specific running pattern.

To illustrate the invention described in this application, a simple cycle will be described in which the effect of the invention can clearly be seen. In this cycle a gas turbine is switched on from a cold state (that is, a state in which all the parts are at about ambient temperature (for example about 25 degrees Celsius)) to full load. The gas turbine is then run at full load for an extended period of time (long enough to reach steady state, which depends on the size of the turbine but would typically be somewhere between 6 and 72 hours), before being switched off.

After an extended period of time in constant (or near-constant) use at the same load level, typically a period of at least a few hours, the various parts in a gas turbine reach steady state temperatures. These temperatures vary widely from one component to another, and even across the same component, but as long as the gas turbine continues to be run in the same state, the temperatures remain largely constant. This state is called steady state, and the clearance (the minimum distance) between the turbine vane carrier and the blades during steady state running is the steady state running clearance.

When the gas turbine is shut down, the gas turbine starts to run down from running speed and the temperature of various parts of the gas turbine starts to reduce. In this cool-down phase, cooling does not happen at the same rate in all the components. Generally, a smaller surface area to mass ratio of the component results in slower cooling. Other factors such as the heat capacity of the materials can also be relevant.

In the turbine, the vanes and blades will cool down relatively quickly, the turbine vane carrier will cool down relatively slowly, and the rotor will cool down even more slowly. As a result, the size of the vanes, blades and turbine vane carrier will shrink more quickly than the size of the rotor. The turbine vane carrier generally shrinks further relative to the rotor than the vanes and blades do, meaning that without extra clearance between the blades and vanes and the rotor and turbine vane carrier, the blades and vanes could impact the turbine vane carrier and rotor respectively during cooling (i.e. the stator and rotor may impact). This could cause damage, and should be avoided. As a result of the different cooling speeds of the different gas turbine components, the clearance therefore reduces during at least part of the cool-down phase. There is therefore a clearance minimum during the cool-down phase. The point at which the clearance is at its smallest possible value during the gas turbine cycle (the pinch point) occurs if the gas turbine is restarted at the cool-down phase clearance minimum. Just before start up, only thermal effects are contributing to the reduced clearance. Just after start up, once the rotor is running at high speed or full speed, elastic expansion from the centrifugal force extends the radial length of the rotor and blade, thereby further reducing the clearance relative to the turbine vane carrier and vanes. As a result, the pinch point clearance occurs shortly after a start up at the cool-down phase clearance minimum.

A method of operating a gas turbine providing a compressor, a combustor downstream of the compressor, and a turbine providing a turbine vane carrier downstream of the combustor during the cool-down phase comprises the step of feeding a flow of cooling air from the compressor to the turbine vane carrier. It also comprises the step of measuring the temperature 70, 72, 74, 76 of the flow of cooling air and the temperature 78 of the turbine vane carrier. The flow of cooling air is fed at a first flow rate when the temperature 78 of the turbine vane carrier is lower than the temperature 70, 72, 74, 76 of the cooling air, and the flow of cooling air is fed at a second flow rate when the temperature 78 of the turbine vane carrier is higher than the temperature 70, 72, 74, 76 of the cooling air. The first flow rate is higher than the second flow rate.

An example of the method is now described with reference to the gas turbine in FIGS. 1 and 2. In this example, three flows of cooling air 10, 20, 30 are fed from the compressor 2 to the turbine 6. The flows of cooling air can be controlled by control valves 12, 22, 32. Part or all of the flow of high-pressure cooling air 30 may be directed through a cooling unit 34, such as a once-through cooler. In the turbine 6, the flows of cooling air are directed to the turbine vane carrier 50.

As discussed above, during use, a gas turbine may be run constantly for a period of time, and after a sufficient length of time the gas turbine reaches a steady state. After the gas turbine is shut down, the various parts and flows of cooling air cool down at varying rates during the cool-down phase. In particular, as the gas turbine starts to run down from running speed, the cooling air temperature can quickly decrease and is cooler than the turbine vane carrier temperature soon after flame off. This cooling air is still fed to the turbine vane carrier 50. During normal operation, it was desirable to cool the turbine vane carrier, but, as discussed above, this is no longer the case during the cool down phase. At this point, it is preferable to try and reduce the rate of cooling of the turbine vane carrier, at least to a cooling-down rate where the required minimum clearance in the turbine (between rotor and stator) is maintained. This can reduce the difference between steady state running clearance and pinch point clearance.

A reduction of the flow rate of cooling can be achieved, for example, by monitoring the temperature 74 of the medium-pressure cooling air 20 and the temperature 78 of the turbine vane carrier 50, and then feeding the medium-pressure cooling air 20 to the turbine vane carrier 50 at a first rate (first flow rate) when the temperature 78 of the turbine vane carrier is lower than the temperature 74 of the medium-pressure cooling air, and then feeding the medium-pressure cooling air at a second rate (second flow rate) when the temperature 78 of the turbine vane carrier is higher than the temperature 74 of the cooling air. The first rate should be higher than the second rate; this will then slow down the rate of turbine vane carrier cooling when compared to a method where the first rate is simply maintained regardless of the relative temperatures 74, 78 of the cooling air and turbine vane carrier.

As well as or instead of monitoring the temperature of and adjusting the flow rate of the medium-pressure cooling air, the temperature could be monitored and the flow rate adjusted for the high-pressure cooling air. In particular, the inclusion of a cooling unit offers a further possibility for reducing the rate of cooling of the turbine vane carrier. A cooling unit such as a once-through cooler can have considerable thermal inertia and can therefore cool down relatively slowly compared to blades and vanes, for example. As a result, a cooling unit such as a once-through cooler can remain hotter than the turbine vane carrier for a significant period of time after shut down, for example several hours.

An embodiment therefore involves feeding a cooling flow such as the high-pressure cooling flow through a cooling unit such as a once-through cooler. This can provide hotter cooling air to the turbine vane carrier than is possible without the extra heat provided by the cooling unit, and can thereby slow down cooling of the turbine vane carrier.

Although only the high-pressure cooling flow is shown as being directed through the cooling unit, other flows such as the medium-pressure cooling air could also be directed through the cooling unit in a similar manner. In such a case, the medium-pressure cooling air would generally only be directed through the cooling unit to heat up the cooling air during the cool-down phase, and would otherwise not be directed through the cooling unit.

In another embodiment, a fan can be used to direct a flow of cooling air such as the high-pressure cooling flow through the cooling unit. This can increase the flow rate. The fan could be upstream of the cooling unit 34 and downstream of the control valve 36, although more generally it could be anywhere upstream or downstream of the cooling unit 34 between the compressor 2 and the turbine 6. In some embodiments, the fan would be turned on only if the temperature of the flow of cooling air is higher than the temperature of the turbine vane carrier, or if the temperature of the flow of cooling air is higher than the temperature of the turbine vane carrier by at least a certain value, for example 20 or 50 degrees Celsius. Additionally or alternatively, the fan would be turned on only if the thermal inertia of the cooling unit was measured to be sufficiently large, based on one or more gas turbine parameters.

In another embodiment, a clearance within the turbine is monitored, and the flow rate of the flow of cooling air is only altered from the first rate to the second rate when the clearance is below a set minimum clearance. For example, the clearance between a part of the stator and a part of the rotor is monitored, such as between the turbine vane carrier and an adjacent blade or between a vane and the rotor. More than one clearance can be monitored; for example, the clearance of blades 1 and 2 could be monitored. Blade 1 is the first blade (the most upstream blade) in the fluid flow direction 8, and blade 2 is the second blade in the fluid flow direction 8.

In one example, during use, the low-pressure cooling air is at about 2 bar, the medium-pressure cooling air is at about 10 bar and the high-pressure cooling air is at about 20 bar.

In one example, one hour after flame off, the temperature of the turbine vane carrier is about 200 to 400 degrees Celsius, the blades and vanes are between 0 and 200 degrees Celsius, and the rotor is between 300 and 600 degrees Celsius. Different parts of these components are at different temperatures; for example, the temperature towards the centre of the rotor is considerably hotter than the outer surface of the rotor adjacent to the blades.

When a flow is reduced, the flow could simply be reduced by using control valves in the flow pipes, such as control valves 12, 22, 32, 36. This would result in a reduction of cooling flow from the compressor. Alternatively or additionally to the reduction of cooling flow from the compressor, escape valves through which cooling flow can be vented off can be provided in the cooling flow pipes upstream of the control valves 12, 22, 32, 36. Another option would be to provide control valves 12, 22, 32 that can direct some or all of the flow to the turbine 6, and that can also directly vent off some or all of the cooling air if required, either directly or through a dedicated vent.

Where multiple different flows of cooling air are provided, such as in the example in FIG. 1, the different flows of cooling air may be set up in a different way. For example, the different flows of cooling air could have different venting systems or different types of control valves. One possible motivation for different designs is differences in cooling air pressure and temperature.

Considerable variation is possible in the flow rates. A decrease in flow may provide a part reduction or a complete reduction down to a minimum allowed flow (for example due to other gas turbine requirements or constraints), or down to no flow at all. Control may be dynamic, with flow rates increasing or with flow rates reducing and then subsequently increasing again.

Flow rates may partly be dictated by other gas turbine requirements; for example, a minimum flow may be necessary to provide cooling to other components. As a result, the differences in flow could be considerable or could be relatively small. At one extreme, a flow of cooling air is fed to the turbine vane carrier at a nominal or maximum flow rate (100%, so all of the available cooling air that can be taken from the compressor at a given bleed-off point or points) when the cooling air is hotter than the turbine vane carrier and no cooling air flows (0%) when the cooling air is colder than the turbine vane carrier. Smaller variations could provide a reduction from, for example, 80% or more of maximum to 30% or less of maximum, or from 100% to 90% or less of maximum. Even a change of just a few percent can help reduce the turbine vane carrier cooling rate.

When temperatures are measured, the temperature can be measured continuously, or can be measured at intervals. The temperature is measured over a period of time during the cool-down phase, for example for the entire cool-down phase or for a first portion of a cool-down phase, for example if it is already known that the methods described herein will only be used during a first portion of the cool-down phase.

Temperature may be directly or indirectly measured. Direct measurement would typically involve a probe or sensor measuring the temperature directly, for example a sensor inside a pipe through which the flow of cooling air is fed, or a sensor attached to the turbine vane carrier. Indirect measurement may take various forms, with examples given below. A combination of direct measurements, indirect measurements or both direct and indirect measurements could also be used.

In one example of indirect temperature measurement, a different gas turbine parameter such as the temperature of another gas turbine component such as a part of the compressor could be measured and then used to estimate the temperature of a flow of cooling air. Similarly, temperature of a component near or adjacent to the turbine vane carrier temperature could be measured and then used to estimate the turbine vane carrier temperature. Alternatively, at least one of the temperature of a flow of cooling air and the temperature of the turbine vane carrier could be estimated based on the length of time since flame off, for example based on knowledge of the temperature behaviour obtained during tests.

In another example of indirect temperature measurement, it may be known that after a first portion of the cool-down phase, for example three hours, the cooling air will always be cooler than the turbine vane carrier, in which there would no longer be any need to actively monitor the cooling air and turbine vane carrier temperature. This can be considered as indirect measurement of the temperature based on a different gas turbine parameter—in this case, the length of time since flame off. In such an example, the flow of cooling air could simply be left at a reduced flow level (relative to when the cooling air was warmer than the turbine vane carrier) without direct monitoring of the temperature.

Similarly, it may be known that the cooling air is always hotter than the turbine vane carrier during a first period of time after flame off, and therefore during this initial time period the flow of cooling air could simply be left at a maximum flow level based on the time rather than on direct temperature measurements.

In another example of indirect temperature measurement, the temperature of a first flow of cooling air and of a second flow of cooling air are monitored. When the temperature of the first flow of cooling air and the second flow of cooling air are the same, the flow of at least one of the first flow and the second flow of cooling air are reduced. More generally, this could be appropriate in embodiments where it is known, for example due to previous measurements, that the point when two different flows reach the same temperatures will be after the point at which the cooling flows have reached a temperature lower than the turbine vane carrier temperature. This may be appropriate with a high-pressure cooling flow and a medium-pressure cooling flow as described above.

Various other measurements and combinations of measurements could also be used as an indirect measurement, such as a measure of power output, of rotation speed of the compressor or the turbine, or of pressure of a cooling flow.

Cooling air flows, for example high-pressure cooling air flow 30, may be extracted from one or more points in the compressor 2. Normally, when more than one extraction point is provided, all the extraction points are at the same axial point on the compressor, and the extraction points are spread out evenly around the circumference of the compressor, but other arrangements may also be used.

Turning off a gas turbine starts with switching off the gas turbine (also known as shut down or flame off). Switching off the gas turbine starts a cool-down phase. The cool-down phase is the phase from flame off until the gas turbine is fully cold (all components at about ambient temperature, for example about 25 degrees Celsius). The length of the cool-down phase depends on various factors, including the size of the gas turbine, and could be a week for a large gas turbine.

The pinch point is the point in the gas turbine cycle at which clearance is at a minimum. The pinch point clearance is generally set during gas turbine design. The minimum allowable running clearance of gas turbine blades is set by the difference between the pinch point clearance and the steady state running clearance.

The gas turbine shown in the Figures is intended as an example only, and is intended to give a general idea of the relative positions of various relevant components to help visualise the invention. As such, the Figures do not necessarily show the exact shape or position of the various parts shown.

The invention in the present application is primarily envisaged for use in heavy-duty gas turbines for power generation, but could also be used in other types of gas turbine. An existing gas turbine could be retrofitted to provide the apparatus described above and to carry out the methods described above. The invention could also be carried out on other types and variants of gas turbine—for example, a single-shaft gas turbine is shown in FIG. 1, but the invention described above could also be implemented on a multiple-shaft gas turbine.

The cooling unit 34 is shown as cooling only the high-pressure cooling air 30, but in some apparatus and methods other cooling air flows could also be partially or entirely routed through the cooling unit. Multiple cooling units could also be provided, for example two or more cooling units for the high-pressure cooling air, or a further separate cooling unit for another cooling air flow such as the medium-pressure cooling air.

The control valve 32 can be seen as providing a bypass for the cooling unit 34. In some embodiments there would be no bypass, and the flow of cooling air would always be directed through the cooling unit.

The controller 40 may be a stand-alone controller or control system, or may be part of a larger system including control elements for other equipment, such as other parts of the gas turbine or for parts of an associated power plant.

Cooling air is described but the method would also work with other fluids.

Three bleed-off points for cooling air are shown in FIG. 1, but one, two, four or more bleed-off points could be provided. Similarly, four vanes and four blades are shown in FIG. 2, but other numbers of vanes and blades could also be provided, and different configurations of membranes 60 and supports 62 are possible.

Various modifications to the embodiments described are possible and will occur to those skilled in the art without departing from the invention which is defined by the following claims.

REFERENCE NUMERALS 1 gas turbine
2 compressor
4 combustor
6 turbine
8 fluid flow direction
10 low-pressure cooling air
12 low-pressure valve
20 medium-pressure cooling air
22 medium-pressure valve
30 high-pressure cooling air
32 high-pressure valve
34 cooling unit
36 cooling unit control valve
40 controller
50 turbine vane carrier
52 vane
54 blade
56 rotor
60 membrane
62 support
70 high-pressure cooling air
72 high-pressure cooling air
74 medium-pressure cooling air temperature
76 low-pressure cooling air temperature
78 turbine vane carrier temperature

The invention claimed is:

1. A method of operating a gas turbine during a cool-down phase, the gas turbine providing a compressor, a combustor downstream of the compressor, and a turbine downstream of the combustor, the turbine providing a turbine vane carrier, the method comprising:
feeding a flow of cooling air from the compressor to the turbine vane carrier;
measuring a temperature of the flow of cooling air; and
measuring a temperature of the turbine vane carrier;
wherein the flow of cooling air is fed at a first flow rate when the temperature of the turbine vane carrier is lower than the temperature of the cooling air; and
wherein the flow of cooling air is fed at a second flow rate when the temperature of the turbine vane carrier is higher than the temperature of the cooling air,
wherein the first flow rate is higher than the second flow rate.

2. The method of claim 1, wherein the flow of cooling air is fed from the compressor to the turbine vane carrier through a cooling unit.

3. The method of claim 2, wherein the flow of cooling air is fed from the compressor to the turbine vane carrier through a once-through cooler.

4. The method of claim 2, wherein a fan is used to direct the flow of cooling air through the cooling unit.

5. The method of claim 1, wherein the flow of cooling air is a first flow of cooling air and a second flow of cooling air is also fed from the compressor to the turbine vane carrier; and
wherein the first flow of cooling air is fed from a first point in the compressor and the second flow of cooling air is fed from a second point in the compressor, the first point being downstream from the second point in a fluid flow direction.

6. The method of claim 5, wherein measuring includes measuring the temperature of the second flow of cooling air; and
the second flow of cooling air is fed at a third flow rate when the temperature of the turbine vane carrier is lower than the temperature of the second flow of cooling air;
wherein the second flow is fed at a fourth flow rate when the temperature of the turbine vane carrier is higher than the temperature of the second flow of cooling air; and
wherein the third flow rate is higher than the fourth flow rate.

7. The method of claim 1, wherein a clearance within the turbine is monitored, and wherein the flow rate of the flow of cooling air is only altered from the first rate to the second rate when the clearance is below a set minimum clearance.

8. The method of claim 1, wherein the temperature of the flow of cooling air is measured by directly measuring the temperature of the flow of cooling air, or is measured indirectly by measuring a gas turbine parameter and estimating the temperature of the flow of cooling air.

9. The method of claim 8, wherein the gas turbine parameter is a temperature of a different gas turbine component or a time since a start of a cool-down phase of the gas turbine.

10. A gas turbine comprising a compressor, a combustor downstream of the compressor, a turbine downstream of the combustor, the turbine providing a turbine vane carrier, and a controller configured and arranged for feeding a flow of cooling air from the compressor to the turbine vane carrier;
measuring a temperature of the flow of cooling air; and
measuring a temperature of the turbine vane carrier;
wherein the flow of cooling air is to be fed at a first flow rate when the temperature of the turbine vane carrier is lower than the temperature of the cooling air; and
wherein the flow of cooling air is to be fed at a second flow rate when the temperature of the turbine vane carrier is higher than the temperature of the cooling air,
wherein the first flow rate is higher than the second flow rate.

* * * * *